United States Patent
Miesak

(10) Patent No.: US 12,498,508 B2
(45) Date of Patent: Dec. 16, 2025

(54) ABSORBING SUBSTRATE MIRROR

(71) Applicant: L3Harris Technologies, Inc., Melbourne, FL (US)

(72) Inventor: Edward Miesak, Windermere, FL (US)

(73) Assignee: L3Harris Technologies, Inc., Melbourne, FL (US)

( * ) Notice: Subject to any disclaimer, the term of this patent is extended or adjusted under 35 U.S.C. 154(b) by 438 days.

(21) Appl. No.: 18/092,675

(22) Filed: Jan. 3, 2023

(65) Prior Publication Data
US 2024/0219609 A1    Jul. 4, 2024

(51) Int. Cl.
| | |
|---|---|
| G02B 5/00 | (2006.01) |
| C03C 17/36 | (2006.01) |
| G01C 3/08 | (2006.01) |
| G02B 5/08 | (2006.01) |
| G02B 23/04 | (2006.01) |
| H01S 3/00 | (2006.01) |

(52) U.S. Cl.
CPC .......... *G02B 5/003* (2013.01); *C03C 17/3649* (2013.01); *G01C 3/08* (2013.01); *G02B 5/0808* (2013.01); *G02B 23/04* (2013.01); *H01S 3/0007* (2013.01)

(58) Field of Classification Search
None
See application file for complete search history.

(56) References Cited

U.S. PATENT DOCUMENTS

| | | | |
|---|---|---|---|
| 5,867,329 A | 2/1999 | Justus et al. | |
| 6,292,314 B1* | 9/2001 | Perger | G02B 23/10 |
| | | | 359/638 |
| 2003/0174315 A1* | 9/2003 | Byren | G01B 11/26 |
| | | | 356/152.1 |
| 2011/0240009 A1 | 10/2011 | Haskins et al. | |
| 2013/0286358 A1* | 10/2013 | Takahashi | G03B 21/14 |
| | | | 353/20 |
| 2015/0043002 A1 | 2/2015 | Kuznetsov et al. | |
| 2017/0099721 A1* | 4/2017 | Tao | H01S 3/0064 |
| 2018/0313939 A1* | 11/2018 | Thomas | G02B 27/142 |
| 2021/0320470 A1* | 10/2021 | Bayramian | H01S 3/1611 |
| 2022/0350083 A1* | 11/2022 | Ducellier | G02B 6/29395 |

OTHER PUBLICATIONS

Optics Tutorial, Rocky Mountains Instrument Co., http://rmico.com/optics-tutorial, downloaded from the internet on Jan. 3, 2023, 4 pages.

\* cited by examiner

*Primary Examiner* — Ryan Crockett
(74) *Attorney, Agent, or Firm* — Edell, Shapiro & Finnan, LLC

(57) ABSTRACT

Provided for herein is a mirror including a substrate and a reflective coating, wherein the substrate is absorptive at a first wavelength and transmissive at a second wavelength, wherein the reflective coating is reflective at the first wavelength; and wherein the reflective coating is arranged on a first side of the substrate opposite a second side of the substrate; a first radiation source configured to transmit radiation at the first wavelength incident on the first side of the substrate; and a second radiation source configured to transmit radiation at the second wavelength incident on the second side of the substrate.

20 Claims, 6 Drawing Sheets

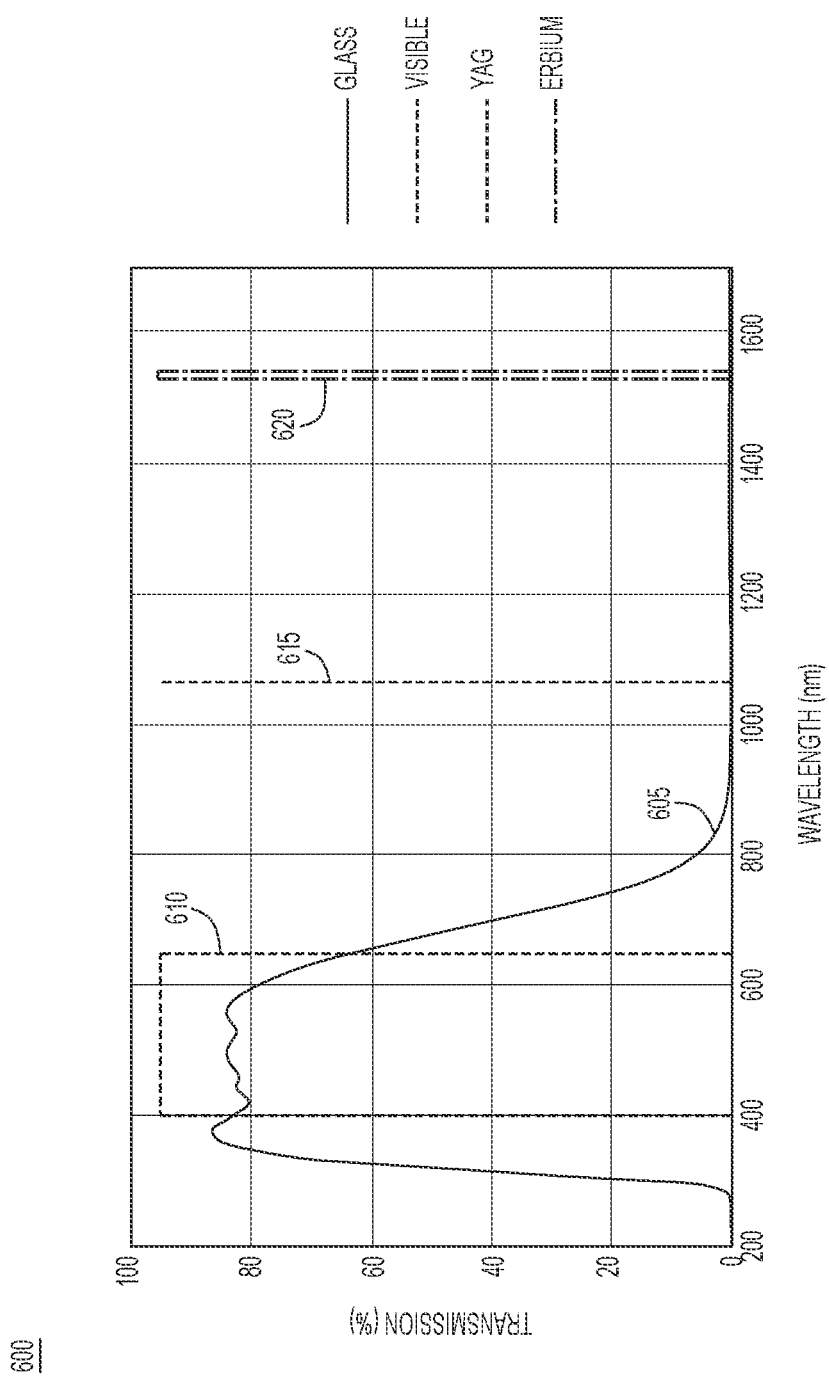

ABSORBING SUBSTRATE MIRROR

TECHNICAL FIELD

The present disclosure relates to optical elements, and mirrors utilized in laser range finders in particular.

BACKGROUND

Mirrors, including laser mirrors, may be fabricated by applying coatings, such as dielectric or metal coatings, to uncoated mirror substrates. Mirror substrates may be made from glass, ceramics, or more rarely, metal. The front surface of the substrate and sometimes also the back surface are polished to high optical tolerances. Mirror substrates may also be used for other optical components such as beam splitters, optical filters and optical windows.

Mirrors are often important components within laser range finders. Laser range finders, also referred to as laser telemeters, use laser beams or pulses to determine the distance to an object. The most common form of laser rangefinder operates on the time of flight principle by sending a laser pulse in a narrow beam towards the object and measuring the time taken by the pulse to be reflected off the target and returned to the range finder.

BRIEF DESCRIPTION OF THE DRAWINGS

FIG. 6 is a graph of a transmission profile for a colored glass that may be used in the techniques of the present disclosure, according to an example embodiment.

DETAILED DESCRIPTION

Overview

Figure 1:
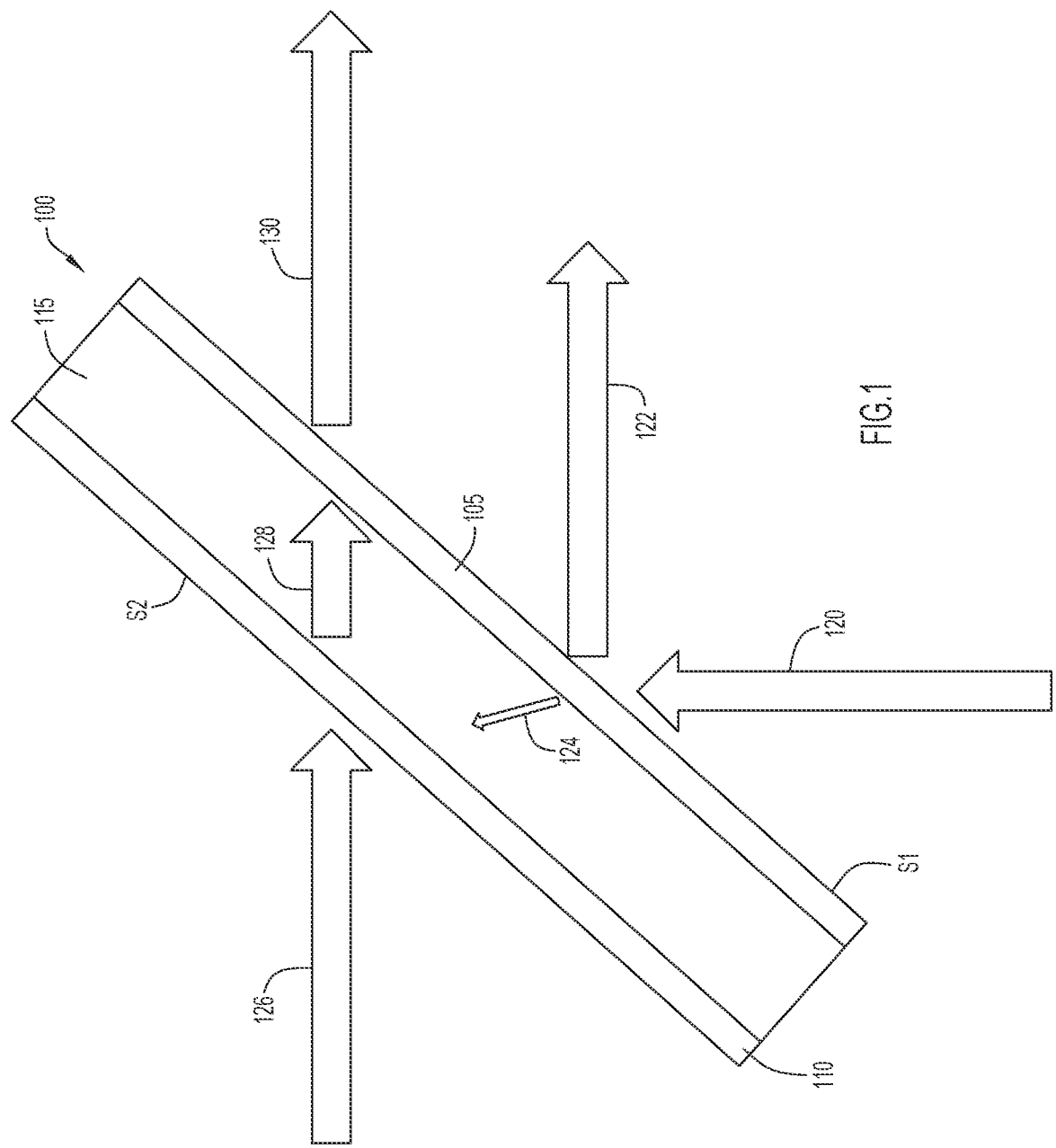
FIG. 1 is an illustration of a mirror constructed according to the techniques of the present disclosure, according to an example embodiment.

In some aspects, the techniques described herein relate to an apparatus including: a mirror including a substrate and a reflective coating, wherein the substrate is absorptive at a first wavelength and transmissive at a second wavelength, wherein the reflective coating is reflective at the first wavelength; and wherein the reflective coating is arranged on a first side of the substrate opposite a second side of the substrate; a first radiation source configured to transmit radiation at the first wavelength incident on the first side of the substrate; and a second radiation source configured to transmit radiation at the second wavelength incident on the second side of the substrate.

In some aspects, the techniques described herein relate to a laser range finder including: a mirror including a substrate and a reflective coating, wherein the substrate is absorptive at a first wavelength and transmissive at a second wavelength, wherein the reflective coating is reflective at the first wavelength; and wherein the reflective coating is arranged on a first side of the substrate opposite a second side of the substrate; a first radiation source configured to transmit first radiation at the first wavelength incident on the first side of the substrate; a second radiation source configured to transmit second radiation at the second wavelength incident on the second side of the substrate; a telescope configured to receive the first radiation reflected from the mirror and the second radiation transmitted through the mirror and receive the first radiation returned from a target; and a detector configured to detect the first radiation returned from the target.

Example Embodiments

The techniques of the present disclosure are directed to a mirror for use in a device such that a first radiation or light source projects first radiation or light that is incident on a first side of the mirror and a second radiation or light source projects second radiation or light that is incident on the second side of the mirror. Throughout the remainder of the disclosure, the terms "light," "radiation" and "electromagnetic radiation" may be used interchangeable. Accordingly, unless specified, the term "light" may refer to radiation or electromagnetic radiation outside of the visible spectrum. The mirror may be arranged such that the mirror directs the first light and the second light along parallel beam paths. A first coating on the first side of the mirror is highly reflective to the first light, and a second coating on the second side of the mirror is highly transmissive to the second light. The material used for the mirror substrate is chosen such that it is substantially absorbent to the first light and substantially transmissive to the second light. By selecting such a material for the substrate, internal reflections of the first light within the substrate may be attenuated, thereby decreasing or preventing any of the first light from transmitting through the substrate and transmitting out of the second side of the mirror. By preventing transmission through the substrate, the first light is also prevented from scattering off of any housing in which the mirror is arranged.

An example of such a mirror is illustrated in FIG. 1. Mirror 100 includes a coating 105 on surface S1, which is highly reflective to first incident light 120. Accordingly, the majority of first incident light 120 is reflected as first reflected light 122. A small portion of first incident light 120 penetrates into substrate 115 as first internal light 124. However, because substrate 115 is highly absorptive with respect to first incident light 120, first internal light 124 is attenuated within substrate 115 such that little to none of first internal light 124 escapes from surface S2.

With respect to second incident light 126, which is incident on surface S2, coating 110 is highly transmissive with respect to second incident light 126. Accordingly, substantially all of second incident light 126 penetrates into substrate 115 as second internal light 128. Because substrate 115 is also substantially transmissive with respect to second incident light 126, substantially all of second internal light 128 transmits through substrate 115 and transmits as second transmitted light 130.

According to specific example embodiments, mirrors constructed according to the disclosed techniques, such as mirror 100 of FIG. 1, may be incorporated into laser range finders (LRFs). The mirror may be used to combine light from a reference light beam (used by the operator of the LRF to aim the LRF) and the range finding laser pulse (used in the range-finding techniques of the LRF). The substrate material for the mirror may be selected such that it is absorbent to the laser pulse and transmissive to the reference light. Such a construction may decrease or minimize scattered laser pulse light that could find its way to the LRF detector. For example, and as will be described in detail below, the mirror substrate may be constructed from phosphate or silicate glass doped with, for example, samarium or praseodymium. A substrate constructed from such materials may be absorbent to infrared electromagnetic radiation. For example, infrared radiation with wavelengths between 1400 and 1550 nm, and more specifically, 1535 nm±5 nm, are common wavelengths for LRF laser pulse sources. The substrate may be transmissive for electromagnetic radiation having wavelengths between 400 and 700 nm within the visible spectrum. Specifically, reference radiation sources that operate with wavelengths of approximately 600-800 nm, or more specifically 650-675 nm, are commonly used for LRF reference light beams as the orange/red light within this bandwidth may be highly visible to LRF operators.

When implemented in an LRF, the substrate material is selected to be transmissive for the reference light because the detector is configured to detect only the laser pulse light. Accordingly, the reference light does not contribute to detector saturation while the laser light does. A mirror substrate that is transmissive with respect to the reference light but absorptive with respect to the laser light allows for an LRF design that is compact while mitigating detector saturation due to scattered/stray light coming out of the out-going laser pulse. A substrate that is highly absorptive with respect to the laser light while being transmissive with respect to the reference light essentially "seals" scattered laser light photons in the LRF housing behind the mirror preventing them from reaching the detector while allowing the reference light photons to pass through the substrate. The use of such a mirror substrate may mitigate the need for a spatial filter in front of the detector, allowing the volume to the LRF to remain relatively small.

Figure 2:
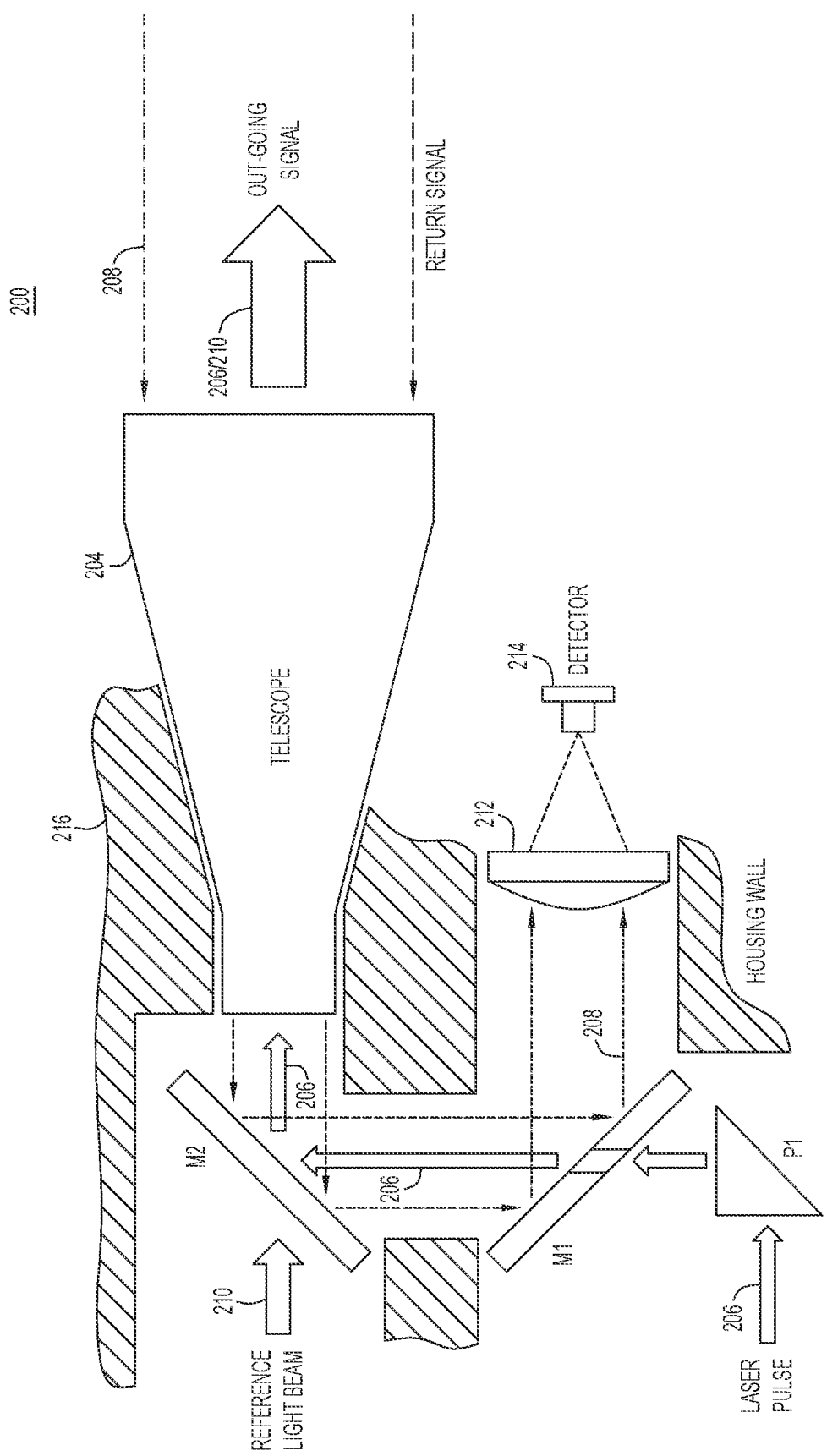
FIG. 2 is an illustration of a laser range finder incorporating a mirror constructed according to the techniques of the present disclosure, according to an example embodiment.

With reference made to FIG. 2, depicted therein is an internal view of an LRF 200 that incorporates a mirror constructed in the manner described above with reference to mirror 100 of FIG. 1. LRF 200 implements a coaxial design, i.e., LRF 200 includes one telescope 204 that is used to launch the outgoing laser pulse 206 and collect the return signal 208. This simplifies the system and reduces volume and cost. As understood by the skilled artisan, laser pulse 206 is projected from the LRF 200 using telescope 204. The outgoing pulse 206 is directed such that it is incident on a target whose range is to be determined. Light reflected or scattered from the target returns to LRF 200, where it is collected by telescope 204 and directed onto detector 214 by mirror M2, mirror M1 and lens 212. The distance to the target may be determined using time-of-flight techniques based upon the time between the projection of laser pulse 206 and receipt of return signal 208 at detector 214.

LRF 200 also includes a reference beam 210. Reference beam 210 is used by the operator of LRF 200 to aim the LRF 200 at the target whose range is to be determined. Accordingly, reference beam 210 may be embodied as laser light within the visible spectrum. To ensure that the reference beam 210 can be used to accurately aim LRF 200, reference beam 210 is combined with the laser pulse 206 so they both point in the same direction. As described below, mirror M2 is used to combine laser pulse 206 and reference beam 210.

Accordingly, coatings are applied to mirror M2 to give it maximum reflectance at the wavelength of laser pulse 206 and maximum transmission at the wavelength of reference beam 210. Mirror M2 is also constructed according to the techniques of the present disclosure to ensure that it provides sufficient transmission of reference beam 210 while ensuring that a portion of the light transferred through the mirror is not scattered from the housing walls surrounding M2 and find its way onto detector 214.

As illustrated in FIG. 2, the laser pulse 206 enters prism P1 where it is turned 90 degrees and passes through the hole in "donut" mirror M1. Laser pulse 206 then reflects off mirror M2 and enters the up-collimating telescope 204 where it is sent to its intended target as outgoing pulse 206/210. Reference beam 210, on the other hand, passes through mirror M2 and enters the up-collimating telescope 204 where it also is also sent to the intended target as part of out-going pulse 206/210. When the laser pulse 206 hits the target, it generates a return signal 208 that travels back to the telescope 204 where it is captured and down-collimated by telescope 204. The return signal then reflects off mirrors M2 and M1 and is focused by lens 212 onto detector 214.

The LRF laser source (not illustrated) produces high energy pulses 206 to generate enough photons scattering off the target so the detector 214 will be able to respond. If sufficient light from laser pulse 206 is scattered as it traverses the optics of LRF 200, the scattered light may saturate detector 214 as it passes through LRF 200 on its way out of the housing. The harder the detector 214 is saturated the longer it takes for it to recover.

Specifically, detector 214 is generally required to be very sensitive as the return signal measured by the LRF 200 may be as small as a handful of nanowatts, i.e., $10^{-9}$ Watts. In other words, detector 214 needs to be sensitive enough to detect extremely small signals. As the power of the return signal increases so will the amplitude of the detector output signal. At some point the output signal will saturate. For example, a reasonable saturation threshold for an LRF may be on the order of 100 microwatts ($100 \times 10$-6 Watts). A signal higher than this will saturate the detector while a signal weaker than this will not saturate the detector. If a signal slightly above the saturation threshold is presented to the detector it will recover quickly once the signal is removed. The recovery time will increase as the signal strength increases beyond the saturation threshold. Therefore, one goal of LRF design may be to keep all signals close to, but below, the saturation threshold so that detector 214 can respond to incoming signals.

Another goal of LRF design is to minimize detector saturation due to light scattered from out-going laser pulses 206. For example, one source of detector saturation may be portions of laser pulse 206 that passes through mirror M2 and is scattered by the housing wall 216. For example, if mirror M2 is implemented in LRF 200 without utilizing the techniques disclosed herein, mirror M2 and housing wall 216 cause a sufficient amount of laser pulse 206 to scatter onto and saturate detector 214. Specifically, some of the laser pulse 206 will be internally reflected within mirror M2, exit the back surface of the mirror substrate, and scatter from the housing wall 216 such that it is ultimately incident on detector 214, saturating the detector. The effects of such scattering will now be described with reference to FIGS. 3 and 4.

Figure 3:
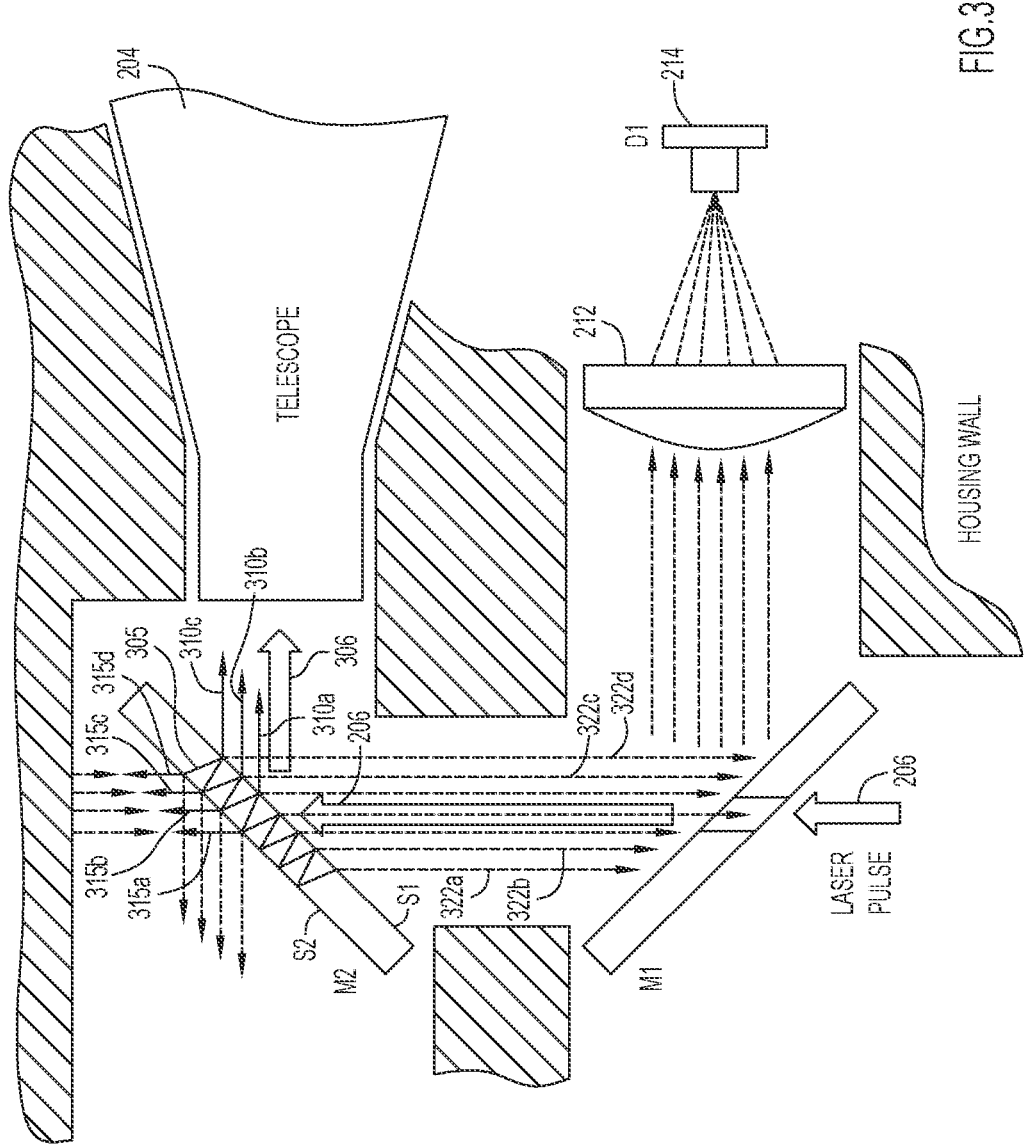
FIG. 3 is an illustration of the laser range finder of FIG. 2 that shows potential transmission paths for radiation transferred by the mirror, according to an example embodiment.

Turning to FIG. 3, depicted therein is a view of LRF 200 that illustrates the portions of laser pulse 206 that is internally reflected within M2 and scattered from the housing wall. A common reflectance for the laser wavelength is >99.7%. Accordingly, 99.7% of incident laser pulse 206 is reflected by mirror M2 as reflected light 306. However, this means that approximately 0.3% of the incident laser pulse 206 will pass through the reflecting coating on surface S1 and enter the substrate of mirror M2. Absent the techniques disclosed herein, this light may reflect multiple times off the substrate surfaces S1 and S2 as internal reflections 305. Each reflection generates a corresponding pulse of light exiting surfaces S1 and S2 as shown through pulses 310a-e and 315a-d, respectively. These pulses are illustrated in more detail in FIG. 4.

Figure 4:
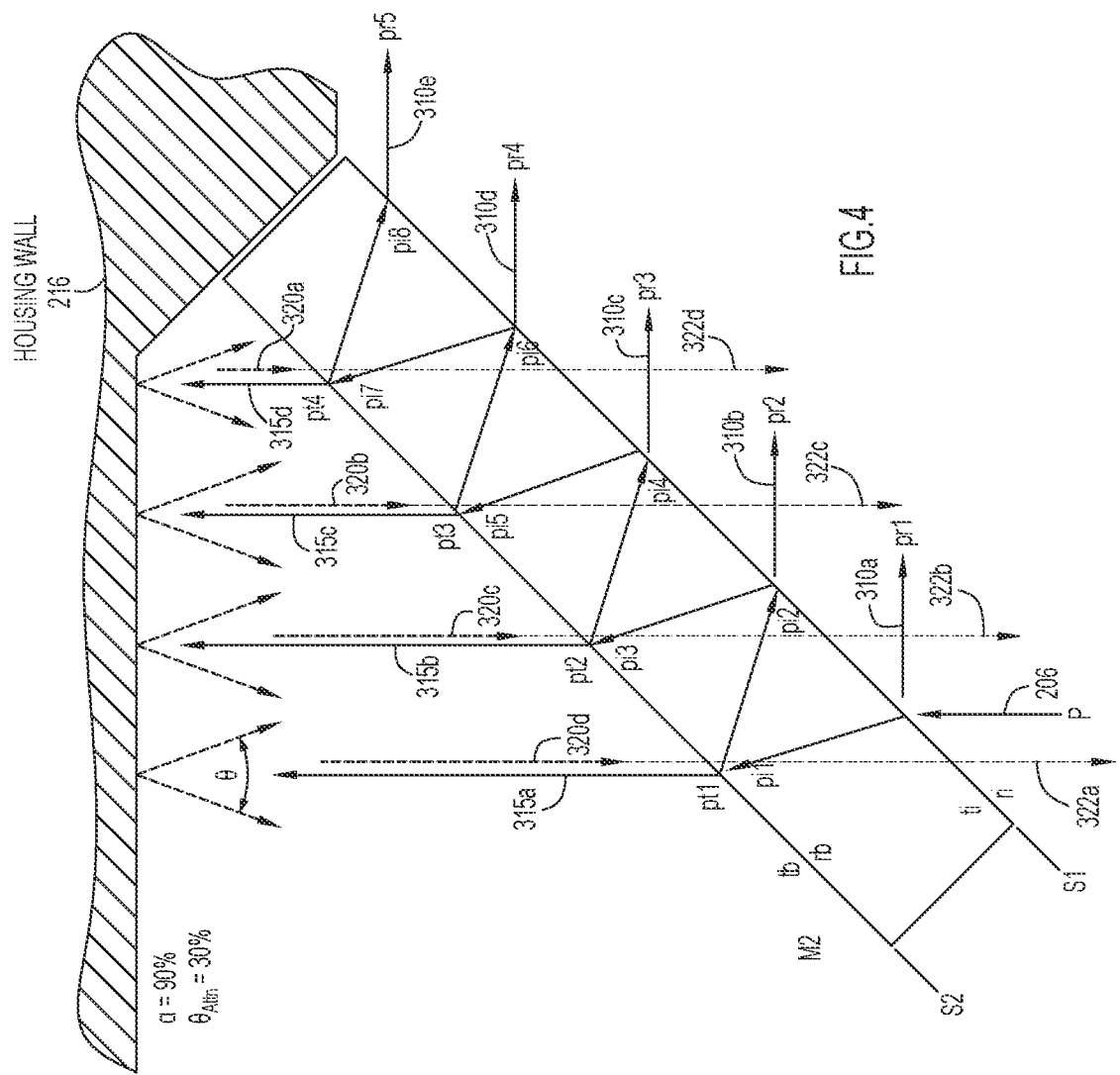
FIG. 4 is a detailed illustration of a laser range finder mirror including potential transmission paths for radiation transferred by the mirror, according to an example embodiment.

With reference now made to FIG. 4, as incident laser pulse 206 hits mirror surface S1 most of it reflects as outgoing pulse 310a due to the presence of the highly reflective coating on surface S1. However, part of incident laser pulse 206 passes through the reflective coating and enters the substrate as pi1. Unless the substrate of mirror M2 is absorptive at the wavelength of laser pulse 206, most of pulse pi1 leaves the substrate as upward propagating light 315a, while part of it reflects off of surface S2 as pi2. At this point most of the energy in pi2 reflects off of surface S1 as pi3 and part of it leaves the substrate as part of the outgoing pulse. This internal reflection continues until all the photons have exited the substrate through surface S1 as part of the outgoing pulses 310a-e or through surface S2 is upward propagating radiation 315a-d.

Pulses 315a-d propagate upward toward the housing wall 216 and pulses 310a-e propagate toward the telescope 204 (illustrated in FIGS. 2 and 3). Upward propagating radiation 315a-d is incident on housing wall 216. In this example, 90% of the energy in upward propagating radiation 315a-d is absorbed by housing wall 216. The remaining 10% of the radiation is scattered into angle θ. In this example 30% of the scattered energy is returned directly along the path of the incoming pulse as pulses 320a-d. Pulses 320a-d (illustrated through dashed lines) are incident on mirror M2. When the substrate of mirror M2 is transmissive with respect to the wavelength laser pulse 206, the scattered pulses 320a-d will experience their own internal reflections within mirror M2, generating parallel copies propagating to the left (not illustrated) and parallel copies 322a-d propagating downward from mirror M1 (illustrated in FIGS. 2 and 3).

Returning to FIG. 3, because this downward propagating radiation 322a-d is travelling along the opposite direction as the out-going laser pulse 206 it is also travelling along the same direction as the return signal 208 (illustrated in FIG. 2). Accordingly, the downward propagating radiation 322a-d is reflected off of donut mirror M1 and focused by lens 212 onto detector 214. The summed energy of the radiation 322a-d on the detector 214 is enough to saturate it hard enough to require an unacceptably long time for detector 214 to recover. For example, even though a substantial portion of the energy of pulses 315a-d is absorbed by housing wall 216 or directed out of telescope 204, the energy in downward propagating radiation 322a-d may nevertheless be sufficient to saturate detector 214.

Provided below is an example calculation of how downward propagating radiation 322a-d may be sufficient to saturate detector 214. Specifically, the calculation is based upon the following values for the elements illustrated in FIG. 4.

Fur purposes of this example it is assumed that out-going laser pulse 206 has an energy of 0.01 Joules and an out-going laser pulse width of 5×10-9 Seconds (FWHM).

Converting this to Watts is calculated as follows:

$$P = \frac{\text{Pulse Energy}}{\text{Pulse Width}} = \frac{0.01}{5 \times 10^{-9}} = 2 \times 10^6 \text{ Watts}$$

Next, the following properties are assumed for mirror M2:
Surface S1 reflects 99.7% of the incident light, and transmits 0.3% of the incident light;
Surface S2 reflects 0.5% of the incident light and transmits 99.5% of the incident light;
The substrate of mirror M2 is 5 mm thick; and
Mirror M2 is arranged at 45 degrees relative to the beam paths of laser pulse 206 and reference beam 210.

Finally, the following properties are assumed for housing wall 216:
The coating on housing wall 216 absorbs 90% of incident light, and
The amount of light scattered off of wall 216 that returns along the path of the incident light is 30%.

Using the above values, the light scattered by each outgoing laser pulse 206 will generate a signal on the detector of 0.5375 Watts. This is 5375 times over the 100 microwatts saturation limit discussed above and will require an unacceptably long time for the detector to recover. The techniques of the present disclosure select materials for the substrate of mirror M2 to ensure that detector 214 does not saturate with an unacceptably long recovery.

Specifically, implementing the techniques of the present disclosure results in the substrate of mirror M2 being selected such that it is highly absorbent to the wavelength of laser pulse 206. Accordingly, any portion of laser pulse 206 that enters into the substrate of mirror M2 will be substantially attenuated, ensuring little to no portion of laser pulse 206 transmits through mirror M2 to be scattered by housing wall 216. In other words, the substrate of mirror M2 is selected such that any portion of laser pulse 206 that enters the substrate is substantially or completely attenuated, preventing internal reflections 305 and upward radiation 315a-d. If no portion of laser pulse 206 is incident on housing wall 216, no light will be scattered back through mirror M2. In other words, downward radiation 320a-d is eliminated. Furthermore, if some light were to transmit through M2 and scatter off the housing wall 216, the downward propagating light would also be absorbed in the substrate of M2. Accordingly, any laser light passing through the reflective coating would have to pass through the substrate twice in order to reach the detector. In other words, downward propagating radiation 322a-d is substantially attenuated. The techniques of the present disclosure may be implemented in LRF 200 to prevent saturation of detector 214 by scattered light from laser pulse 206. Furthermore, because the substrate material is also highly transmissive to the reference beam 210, the substrate will not attenuate reference beam 210.

To serve as a suitable material for the substrate of mirror M2, the material should be strong enough to be cut, polished, and coated, as well as stand up to the mechanical and environmental rigors existing in the LRF. The substrate material may also be optically acceptable in terms of low internal defects such as striae, inclusions, homogeneity, etc. Accordingly, a strong glass, such phosphate glass or silicate glass may be selected as these types of glass exhibit the necessary mechanical characteristics to serve as a mirror substrate.

Furthermore, phosphate and silicate glass may be doped to achieve the desired absorption and transmission properties. For example, a dopant may be selected that exhibits the appropriate transmissivity at the reference beam wavelength while exhibiting the appropriate absorptivity at the laser pulse wavelength. Two viable dopants are samarium and praseodymium.

Figure 5:
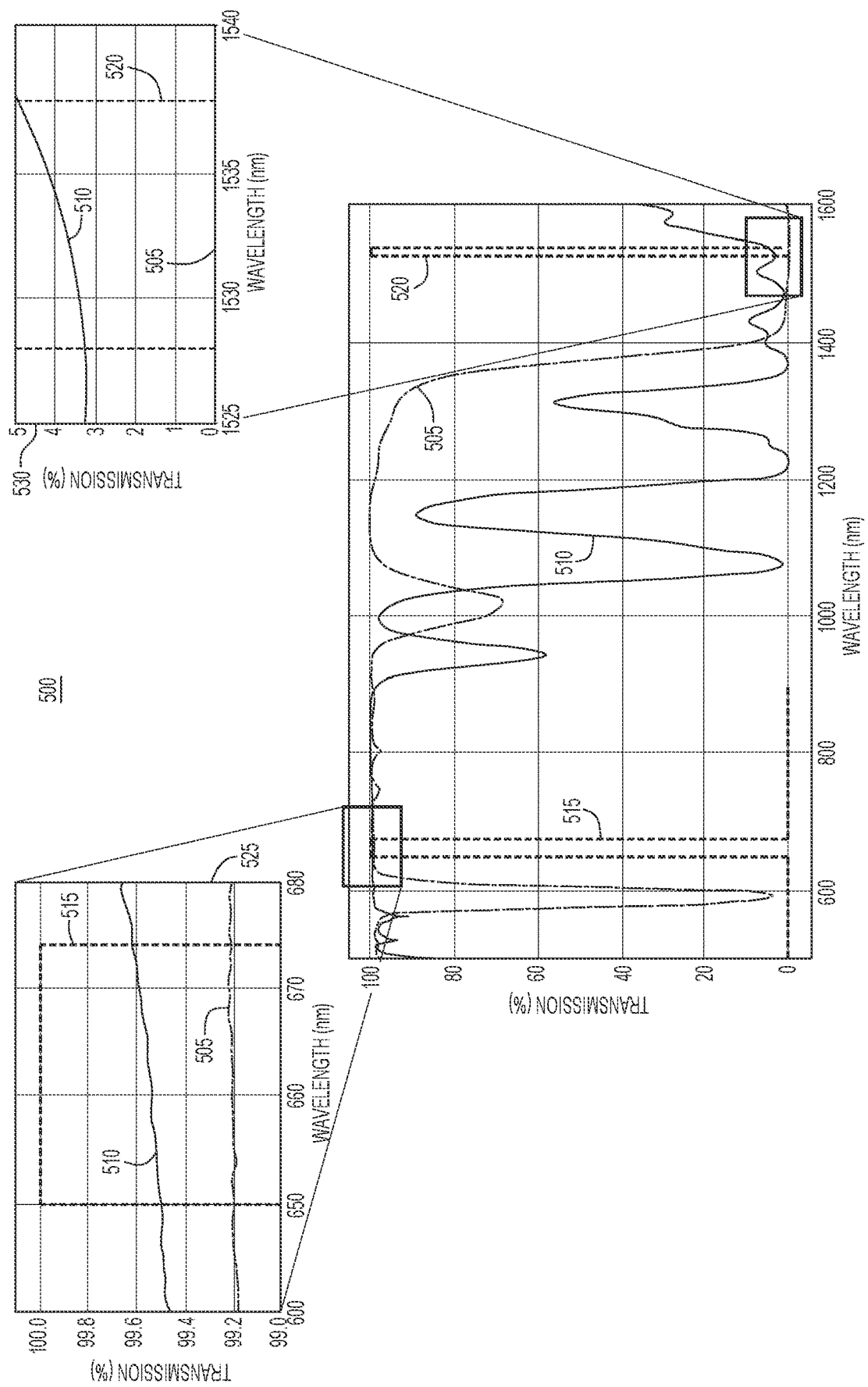
FIG. 5 is a graph of transmission profiles for samarium and praseodymium doped glasses utilized as mirror substrates, according to example embodiments.

Illustrated in FIG. 5 is a graph 500 that includes a transmission profile 505 for praseodymium doped glass and a transmission profile 510 for samarium doped glass overlaid with an indication 515 of a wavelength bandwidth of an example LRF reference beam and an indication 520 of a wavelength bandwidth of an example LRF laser pulse beam. Transmission profiles 505 and 510 are for 10 mm thick glass samples. The transmission profile 505 for praseodymium doped glass is doped approximately 10% by weight with praseodymium, though other doping amounts may be used without deviating from the techniques disclosed herein. For example, glass doped with praseodymium at 5% by weight, 15% weight, 20% by weight, or other values may be used depending on glass thickness and other factors understood by the skilled artisan. The transmission profile 510 for samarium doped glass is similarly doped approximately 10% by weight with samarium. However, other doping amounts, such as 15% weight, 20% by weight, 25% by weight, 30% by weight, or other values may be used depending on glass thickness and other factors understood by the skilled artisan. For example, thinner samples will have higher transmissions, which may affect the amount of doping in a substrate used for a particular application.

As highlighted through detail 525, both transmission profile 505 for praseodymium doped glass and transmission profile 510 for samarium doped glass have very good transmission between 650 nm to 675 nm, the bandwidths corresponding to an LRF reference beam. Specifically detail 525 illustrates that samarium doped glass (transmission profile 510) has an average transmission of about 99.5% and the praseodymium doped glass (transmission profile 505) has an average transmission of about 99.2% for wavelengths between 650 and 675 nm. Detail 530, on the other hand, indicates that both transmission profile 505 for praseodymium doped glass and transmission profile 510 for samarium doped glass have poor transmission for wavelengths of 1533 nm±5 nm, wavelengths corresponding to indication 520 of a wavelength bandwidth of an example LRF laser pulse beam. Specifically, the samarium doped glass (transmission profile 510) has an average transmission of about 3.8% and the praseodymium doped glass (transmission profile 505) has an average transmission of about 0%. In other words, both praseodymium doped glass and samarium doped glass are highly absorbent at wavelengths associated with an example LRF laser pulse beam.

Using either one of these glasses as the substrate for mirror M2 will reduce the scattered/stray light falling on detector 214 with each out-going laser pulse and thus reduce its recovery time. For example, if the calculations described are performed taking into consideration optical absorption due to a samarium and praseodymium doped glass substrate, the amount of radiation incident on the detector 214 drops to close to zero. The results show that the 5375 times over threshold was reduced to almost zero with either glass.

While praseodymium and samarium doped glass are one example material used in a mirror substrate according to the disclosed techniques, other materials may also be used so long as they exhibit the appropriate properties. For example, illustrated in FIG. 6 is a graph 600 of the transmission profile 605 for a colored glass (sold under the trade name "FGS600" by Schott) with transmission properties that may allow it to be used in conjunction with a visible reference light and a Yttrium Aluminum Garnet (YAG) or Erbium laser source. As illustrated in FIG. 6, transmission profile 605 has relatively high transmissivity in the visible light range 610 and relatively low transmissivity in both of the wavelength region associated with a YAG laser 615 and the wavelength region associated with an Erbium laser 620.

In summary, some of the techniques described herein relate to an apparatus including: a mirror including a substrate and a reflective coating, wherein the substrate is absorptive at a first wavelength and transmissive at a second wavelength, wherein the reflective coating is reflective at the first wavelength; and wherein the reflective coating is arranged on a first side of the substrate opposite a second side of the substrate; a first radiation source configured to transmit radiation at the first wavelength incident on the first side of the substrate; and a second radiation source configured to transmit radiation at the second wavelength incident on the second side of the substrate.

In some aspects, the techniques described herein relate to an apparatus, wherein the second wavelength includes a visible wavelength.

In some aspects, the techniques described herein relate to an apparatus, wherein the second wavelength includes a wavelength between 600 and 800 nm.

In some aspects, the techniques described herein relate to an apparatus, wherein the first wavelength includes an infrared wavelength.

In some aspects, the techniques described herein relate to an apparatus wherein the first wavelength includes a wavelength between 1400 and 1550 nm.

In some aspects, the techniques described herein relate to an apparatus, wherein the apparatus is incorporated into a laser range finder and the first radiation source includes a range finding radiation source of the laser range finder.

In some aspects, the techniques described herein relate to an apparatus, wherein the second radiation source includes a reference light source of the laser range finder.

In some aspects, the techniques described herein relate to an apparatus, wherein the substrate includes a doped glass substrate.

In some aspects, the techniques described herein relate to an apparatus, wherein the substrate is doped with samarium.

In some aspects, the techniques described herein relate to an apparatus, wherein the substrate is doped with praseodymium.

In some aspects, the techniques described herein relate to a laser range finder including: a mirror including a substrate and a reflective coating, wherein the substrate is absorptive at a first wavelength and transmissive at a second wavelength, wherein the reflective coating is reflective at the first wavelength; and wherein the reflective coating is arranged on a first side of the substrate opposite a second side of the substrate; a first radiation source configured to transmit first radiation at the first wavelength incident on the first side of the substrate; a second radiation source configured to transmit second radiation at the second wavelength incident on the second side of the substrate; a telescope configured to receive the first radiation reflected from the mirror and the second radiation transmitted through the mirror and receive the first radiation returned from a target; and a detector configured to detect the first radiation returned from the target.

In some aspects, the techniques described herein relate to a laser range finder, further including a lens, wherein the telescope, the mirror, the detector and the lens are arranged such that the first radiation returned by the target is reflected off the mirror towards the lens and directed onto the detector by the lens.

In some aspects, the techniques described herein relate to a laser range finder, further including a donut mirror including a hole arranged between the first radiation source and the mirror such that the first radiation transmitted by the first radiation source incident on the mirror passes through the hole in the donut mirror and the first radiation returned from the target is reflected towards the lens by the donut mirror.

In some aspects, the techniques described herein relate to a laser range finder, wherein the second wavelength includes a visible wavelength.

In some aspects, the techniques described herein relate to a laser range finder, wherein the second wavelength includes a wavelength between 600 and 800 nm.

In some aspects, the techniques described herein relate to a laser range finder, wherein the first wavelength includes an infrared wavelength.

In some aspects, the techniques described herein relate to a laser range finder, wherein the first wavelength includes a wavelength between 1400 and 1550 nm.

In some aspects, the techniques described herein relate to a laser range finder, wherein the substrate includes a doped glass substrate.

In some aspects, the techniques described herein relate to a laser range finder, wherein the substrate is doped with samarium or praseodymium.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
   a mirror comprising a substrate and a reflective coating, wherein the substrate is absorptive at a first wavelength and transmissive at a second wavelength, wherein the reflective coating is reflective at the first wavelength; and wherein the reflective coating is arranged on a first side of the substrate opposite a second side of the substrate;
   a first radiation source configured to transmit radiation at the first wavelength incident on the first side of the substrate; and
   a second radiation source configured to transmit radiation at the second wavelength incident on the second side of the substrate.

2. The apparatus of claim 1, wherein the second wavelength comprises a visible wavelength.

3. The apparatus of claim 1, wherein the second wavelength comprises a wavelength between 600 and 800 nm.

4. The apparatus of claim 1, wherein the first wavelength comprises an infrared wavelength.

5. The apparatus of claim 1 wherein the first wavelength comprises a wavelength between 1400 and 1550 nm.

6. The apparatus of claim 1, wherein the apparatus is incorporated into a laser range finder.

7. The apparatus of claim 6, wherein the first radiation source comprises a range finding radiation source of the laser range finder.

8. The apparatus of claim 6, wherein the second radiation source comprises a reference light source of the laser range finder.

9. The apparatus of claim 1, wherein the substrate comprises a doped glass substrate.

10. The apparatus of claim 9, wherein the substrate is doped with samarium.

11. The apparatus of claim 9, wherein the substrate is doped with praseodymium.

12. A laser range finder comprising:
    a mirror comprising a substrate and a reflective coating, wherein the substrate is absorptive at a first wavelength and transmissive at a second wavelength, wherein the reflective coating is reflective at the first wavelength; and wherein the reflective coating is arranged on a first side of the substrate opposite a second side of the substrate;
    a first radiation source configured to transmit first radiation at the first wavelength incident on the first side of the substrate;
    a second radiation source configured to transmit second radiation at the second wavelength incident on the second side of the substrate;
    a telescope configured to receive the first radiation reflected from the mirror and the second radiation transmitted through the mirror and receive the first radiation returned from a target; and
    a detector configured to detect the first radiation returned from the target.

13. The laser range finder of claim 12, wherein the second wavelength comprises a visible wavelength.

14. The laser range finder of claim 13, wherein the second wavelength comprises a wavelength between 600 and 800 nm.

15. The laser range finder of claim 12, wherein the first wavelength comprises an infrared wavelength.

16. The laser range finder of claim 15, wherein the first wavelength comprises a wavelength between 1400 and 1550 nm.

17. The laser range finder of claim 12, wherein the substrate comprises a doped glass substrate.

18. The laser range finder of claim 17, wherein the substrate is doped with samarium or praseodymium.

19. A laser range finder comprising:
    a mirror comprising a substrate and a reflective coating, wherein the substrate is absorptive at a first wavelength and transmissive at a second wavelength, wherein the reflective coating is reflective at the first wavelength; and wherein the reflective coating is arranged on a first side of the substrate opposite a second side of the substrate;
    a first radiation source configured to transmit first radiation at the first wavelength incident on the first side of the substrate;
    a second radiation source configured to transmit second radiation at the second wavelength incident on the second side of the substrate;
    a telescope configured to receive the first radiation reflected from the mirror and the second radiation transmitted through the mirror and receive the first radiation returned from a target;
    a detector configured to detect the first radiation returned from the target; and
    a lens, wherein the telescope, the mirror, the detector and the lens are arranged such that the first radiation returned by the target is reflected off the mirror towards the lens and directed onto the detector by the lens.

20. The laser range finder of claim 19, further comprising a donut mirror comprising a hole arranged between the first radiation source and the mirror such that the first radiation transmitted by the first radiation source incident on the mirror passes through the hole in the donut mirror and the first radiation returned from the target is reflected towards the lens by the donut mirror.

\* \* \* \* \*